June 21, 1938.　　J. W. LOGAN, JR　　2,121,546
BRAKE CONTROL APPARATUS
Filed Feb. 1, 1936

INVENTOR
JOHN W. LOGAN, JR.
BY Wm. M. Cady
ATTORNEY

Patented June 21, 1938

2,121,546

UNITED STATES PATENT OFFICE 2,121,546

BRAKE CONTROL APPARATUS

John W. Logan, Jr., Forest Hills, Pa., assignor to The Westinghouse Air Brake Company, Wilmerding, Pa., a corporation of Pennsylvania Application February 1, 1936, Serial No. 61,963

46 Claims. (Cl. 303—3)

This invention relates to brake control apparatus, and more particularly to brake control apparatus for railway trains and traction vehicles.

Brake equipments have heretofore been proposed for railway trains and traction vehicles in which a fluid pressure operated wheel brake and a magnetic track brake have been employed. In a preferred type of such brake equipments the fluid pressure brake only is applied upon movement of the brake control handle through a first portion of the application zone, and at the end of this zone and at the beginning of a second portion of the application zone the magnetic track brake is applied.

It is usually desirable that the magnetic track brake be applied only when a rate of retardation above some predetermined value is desired, as for example above three miles per hour per second. It is further desirable that when the track brake is applied it be applied to its maximum degree so as to eliminate the necessity of including in the apparatus additional and expensive parts for graduating the supply of current to the track brake devices.

In the heretofore proposed equipments a retardation controller device has been provided so that different rates of retardation may be maintained, as desired, to thus decelerate the train or vehicle smoothly and with a view to eliminating wheel sliding. Where a retardation controller device of this type is provided it is preferable that it be utilized as a "brake valve", the operator applying the brakes by selecting a desired rate of retardation.

In a brake equipment employing this "brake valve" type of retardation controller device, if the fluid pressure brake alone is applied during the first movement of the brake control handle, and the magnetic track brake is then applied to a maximum degree at the end of this movement, without at the same time diminishing the degree of application of the fluid pressure brake, then the combined braking of the two brakes will cause a momentary sharp increase in rate of retardation, which would cause discomfort to the passengers and possibly produce damaging shocks. To avoid this, it is desirable that the build up of current in the magnetic track brake devices should be retarded to give the retardation controller device time to reduce the degree of application of the fluid pressure brakes.

On the other hand, if after the fluid pressure brakes are applied by a movement of the brake control handle in the first application zone, it is desired to quickly apply the brakes to a maximum or other high degree, as for example to avoid collision, the current should be permitted to build up rapidly in the track brake devices, so as to not lengthen the stop.

It is a principal object of the present invention to provide a brake equipment of the combined fluid pressure and magnetic track brake type heretofore referred to, in which if the track brake is applied after the fluid pressure brake has been applied the build-up of current in the track brake devices may be retarded, but if an instantaneous high degree of braking is desired, following application of the fluid pressure brakes, then the current may be caused to build up rapidly in the track brake devices without delay.

A further object of the invention is to provide a brake equipment of the type just referred to in which the rate of build up of current in the track brake devices is controlled by the simple manipulation of a brake control handle, small incremental movements of the handle, following application of the fluid pressure brakes, providing for slow build up of current in the track brake devices, and relatively large incremental movements of the brake control handle providing for fast build up of current.

A further object of the invention is to provide a brake equipment of the aforementioned type in which a retardation controller device is selectively actuated by the one brake control handle to establish a desired rate of retardation at which the vehicle is to be decelerated.

A still further object of the invention is to provide a brake equipment in which the degree of application of the track brakes is reduced automatically when the degree of application of the fluid pressure brakes drops below a certain value.

A yet further object of the invention is to provide a combined fluid pressure and track brake equipment in which the track brake is automatically cut out of action when the speed of the car reduces below a chosen value.

A still further object of the invention is to provide a brake equipment of the type hereinbefore referred to which embodies the control commonly referred to as "deadman control".

Still further objects and advantages of the invention, dealing with specific constructions and arrangements of parts, will be more fully understood from the following description, which is taken in connection with the single figure in the attached drawing, showing in schematic and diagrammatic form one embodiment of the invention.

Figure 1:
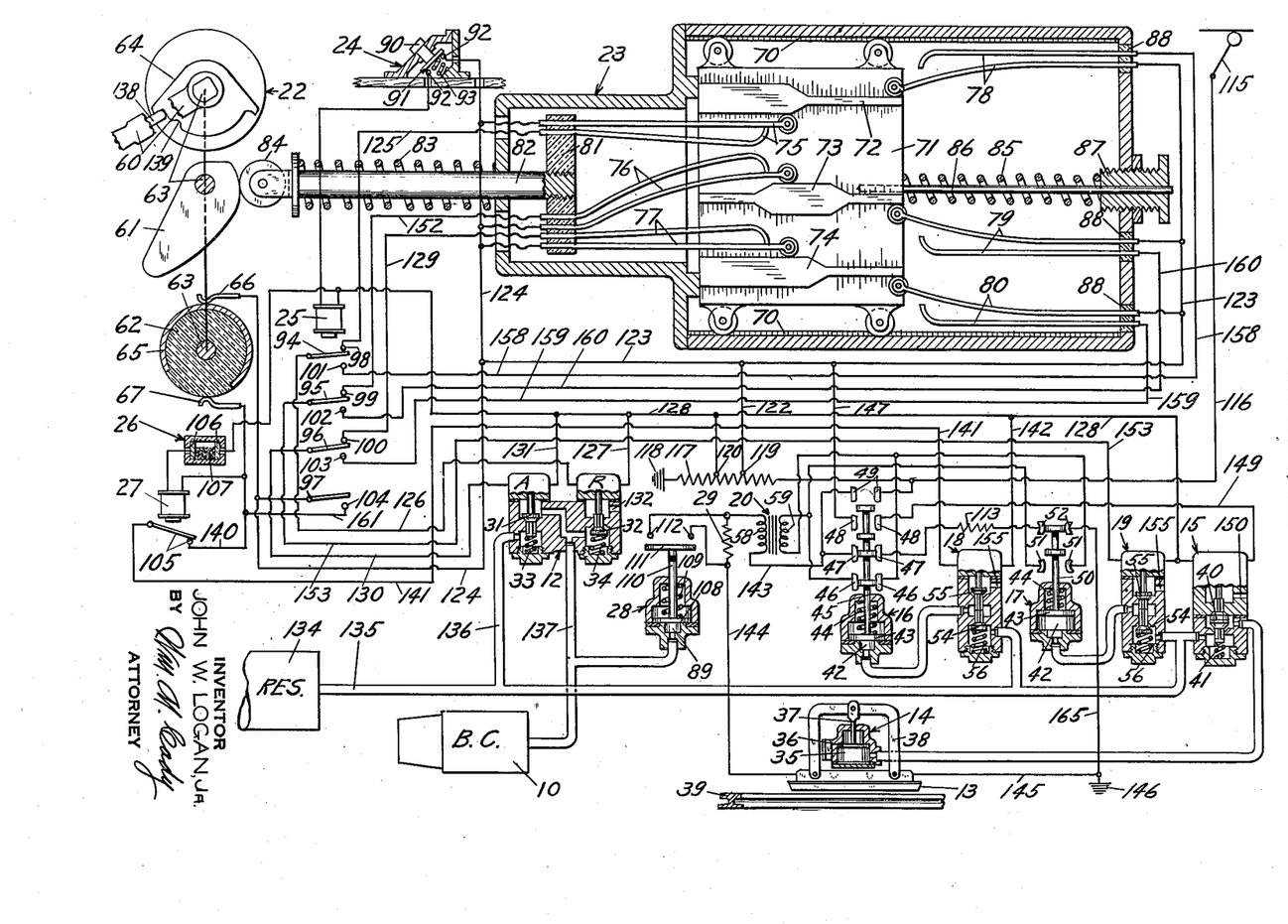

Referring now to this drawing, the fluid pressure brake equipment includes a brake cylinder 10 and an application and release magnet valve device 12 for controlling the supply of fluid under pressure to and its release from said brake cylinder. The track brake equipment includes a track brake device 13, which may be of any of the usual types, a raising cylinder 14 and a magnet valve device 15 for controlling the supply of fluid under pressure to and its release from the raising cylinder. While only one brake cylinder 10 and one track brake device 13 are shown, it will be obvious that any other number may be supplied.

A main switch device 16, an auxiliary switch device 17, magnet valve devices 18 and 19, and a transformer 20 are provided for controlling operation of the track brake device 13, as will hereinafter be more fully described.

The manual control of the brakes is accomplished through a brake controller device 22, which has operatively associated therewith a retardation controller device 23.

The "deadman control" comprises essentially a push switch device 24 and a relay 25.

For cutting the track brakes out of action when the speed of the vehicle drops below a predetermined speed, there are provided a motion detector device 26 and a motion detector relay 27.

For the purpose of reducing the degree of application of the track brakes when the brake cylinder pressure diminishes below a predetermined value, a shunting switch device 28 and a resistance 29 are provided.

Considering these devices now more in detail, the application and release magnet valve device 12 is embodied in a casing provided with an application valve 31 and a release valve 32. The application valve 31 is urged toward unseated position by a spring 33 and toward seated position by an electromagnet (not shown) in the upper part of the casing which when energized actuates the valve downwardly. A spring 34 urges the release valve 32 toward seated position, while another electromagnet (not shown) in the upper part of the casing operates when energized to actuate the valve toward unseated position.

The raising cylinder 14 comprises a casing having a chamber 35 in which is disposed a piston 36 having a stem 37 attached to a yoke 38, which in turn carries the track brake device 13. When fluid under pressure is supplied to the chamber 35 the track brake device 13 is held suspended above a track rail 39, and when fluid under pressure is released from this chamber 35 the track brake device 13 drops by gravity to engagement with the rail.

The track brake application magnet valve device 15 is embodied in a casing provided with a double beat valve 40 urged toward an upper seated position by a spring 41, and toward a lower seated position by action of an electromagnet (not shown) in the upper part of the valve device casing, which when energized actuates the double beat valve downwardly.

The main switch device 16 and the auxiliary switch device 17 are similar in that each comprises a casing having a chamber 42 in which is disposed a piston 43 urged downwardly by a spring 44. Piston 43 of the main switch device 16 has attached thereto a stem 45 which has secured thereto and insulated therefrom bridging contact members adapted to open and close, as the case may be, contacts 46, 47, 48 and 49.

The piston 43 of the auxiliary switch device 17 is provided with a stem 50 which has secured thereto and insulated therefrom bridging contacts adapted to close or open, as the case may be, contacts 51 and 52.

The two magnet valve devices 18 and 19 may be duplicate devices, and each may be embodied in a casing provided with a supply valve 54 and a release valve 55. The release and supply valves are arranged so that a spring 56 urges the supply valve toward seated position and the release valve toward unseated position, while an electromagnet (not shown) in the upper part of each valve device casing operates when energized to urge the two valves downwardly to opposite positions.

The transformer device 20 may be of any suitable design comprising a primary winding 58 and a secondary winding 59 suitably disposed on a magnetic core, which has been diagrammatically represented by spaced lines between the two windings.

The controller device 22 is preferably embodied in a casing as a unit, but has been shown in the drawing diagrammatically for the purpose of simplification. Essentially this device comprises a handle 60, a cam 61 and a drum 62 disposed on and rigidly secured to a shaft 63. A quadrant 64 is provided for limiting the movement of the handle 60. As shown, the handle 60 is in release position, and may be moved in a counterclockwise direction through an application zone. As the handle is thus moved, the cam 61 rotates as does the drum 62.

Secured to the drum 62 is a contact segment 65, which is constantly in engagement with a contact finger 66. After the drum 62 has rotated through a predetermined distance or zone the contact segment 65 engages a second contact finger 67 and thereby connects the two contact fingers 66 and 67 together, for a purpose which will appear later.

The retardation controller device 23 is embodied in a casing having a trackway 70 in which may roll an inertia operated body 71 having suitable rollers rolling in the trackway. The body 71 carries three cams 72, 73 and 74. These cams are arranged to be in operative relation with a group of service contacts indicated at 75, 76 and 77. The cams are also in operative relation with a group of emergency contacts designated at 78, 79 and 80.

The service contacts 75, 76 and 77 are carried by an insulating block 81, which is secured to one end of a plunger 82 slidable in the casing of the retardation control device. A spring 83 biases the plunger 82 and insulating block 81 to the left. To the left end of the plunger 82 is secured a roller 84 which bears against a face of the cam 61 in the controller device 22. As the handle 60 of the controller device 22 is rotated in a counterclockwise direction, the cam 61 actuates the plunger 82 to the right, whereupon as may be seen from the configuration of the cams 72, 73 and 74, contacts 75 will be opened first, contacts 77 next, and contacts 76 last.

The inertia operated body 71 is biased to the left by a spring 85 so as to make this manual operation of the service contacts possible, and when the brakes are applied and the vehicle is decelerating the force of inertia moves the body 71 to the right to reverse this operation of the contacts. In actual practice, however, if the vehicle is moving to the left the body 71 would tend to move to the left, but in order to simplify the drawing the retardation controller has been shown in reverse position.

When the body 71 moves to the right it moves with it a rod 86 which is slidable in a bushing 87, the bushing 87 being adjustable so as to adjust the initial tension on the spring 85. By adjusting the initial tension on this spring the retardation controller device may be made to become operative at different rates of retardation for any given position of the service contacts.

The emergency group of contacts 78, 79 and 80 are stationary with respect to the retardation controller device casing, being supported by insulating members 88 mounted in the retardation controller device casing. The position of the emergency group of contacts is that corresponding to the position of the service group when they have been actuated to their extreme position to the right.

The deadman control switch 24 comprises a push button 90 having secured thereto and insulated therefrom a contact 91 adapted to bridge two stationary contacts 92. A spring 93 urges the bridging contact 91 out of engagement with stationary contacts 92, but the contacts may be held in engagement by pressure manually applied to the push button 90.

The relay 25 is provided with movable contacts 94, 95, 96 and 97 which may, with the exception of contact 97, respectively engage front contacts 98, 99 and 100, or which may respectively engage back contacts 101, 102 and 103. The movable contact 97 is adapted to engage only a back contact 104.

The motion detector device 26 is preferably embodied in an insulating casing having disposed at either end thereof two electrically conducting members 106 between which are freely disposed small electrically conducting particles such as carbon granules 107. This device is attached to some portion of the vehicle which vibrates considerably during motion of the vehicle, and is so designed that above a predetermined speed the spacing between the carbon granules, due to vibration, will be such that a large resistance exists between the two members 106, but below this speed the resistance between the members 106 is very greatly reduced, in some instances to as little as one-tenth of the resistance at high speeds.

The relay 27, which is preferably of the slow release type, is connected in series with the motion detector device 26, and is adapted to be energized only when the resistance between the members 106 in the motion detector device corresponds to that existing below the aforesaid predetermined speed. That is, the relay 27 will be energized for all speeds above the said predetermined speed and will be deenergized for all speeds below this speed. This relay is provided with normally closed contacts 105 which are opened when the relay is energized.

The shunting switch device 28 is embodied in a casing provided with a chamber 89 in which is disposed a piston 108 urged downwardly by a spring 109. Secured to the piston 108 is a stem 110 which carries a contact 111 insulated therefrom, which contact is adapted to engage two stationary contacts 112, for the purpose of shunting the resistance 29.

Current for operating the various electrical devices described is obtained from a trolley 115, which has connected thereto through conductor 116 a potentiometer type of resistance device 117. The other terminal of the potentiometer resistance device is connected to ground as indicated at 118. This resistance device is also provided with two terminals 119 and 120 from which current to operate the various electrical devices in the equipment is supplied so long as current is available through the trolley 115.

The operation of this embodiment of my invention is as follows:

*Running condition*

Assuming now that the brake equipment illustrated has been installed on a single vehicle, when the vehicle is running under power the operator maintains the brake controller handle 60 in release position, as shown in the drawing, and maintains pressure applied to the push button 90 of the deadman's switch device 24, through either his foot or his hand.

With current supplied to the trolley 115 and flowing through the potentiometer resistance device 117, the relay 25 will be energized and its movable contacts will be in engagement with its front contacts, as indicated in the drawing. When the relay 25 is thus energized the service group of contacts in the retardation controller device will be rendered effective while the emergency group will be rendered ineffective, as will be presently shown.

Assuming that the speed of the car is above that which would normally result in energizing the motion detector relay 27, the positions of the parts of the other devices in the brake equipment will be as indicated in the drawing.

*Application of fluid pressure brakes*

When it is desired to effect an application of the brakes, the brake controller handle 60 is moved in a counterclockwise direction into the application zone. The cam 61 will then actuate the plunger 82 to the right carrying with it the service group of contacts. As the roller associated with the contacts 75 rolls off the high part of cam 72 and opens contacts 75, the release electromagnet in the magnet valve device 12 will be deenergized. Opening of these contacts 75 interrupts a circuit which beginning from terminal 119 of the potentiometer resistance device 117 includes common supply conductors 122, 123 and 124, contacts 75, conductor 125, contacts 94 and 98 of relay 25, conductor 126, the release electromagnet, conductors 127 and 128, and terminal 120 of the potentiometer resistance device.

As the roller associated with the contacts 77 rolls off the high part of cam 74 and opens contacts 77, the application electromagnet in the magnet valve device 12 will be deenergized, by interrupting the circuit to this magnet valve device which includes, beginning at the common conductor 124, contacts 77, conductor 129, contacts 96 and 100 of relay 25, conductor 130, the application electromagnet, and conductors 131 and 128 back to the potentiometer terminal 120.

Deenergization of the release and application electromagnets results in seating of the release valve 32, to close the communication from the brake cylinder 10 to the atmosphere by way of exhaust port 132, and unseating of the supply valve 31, which establishes communication between a charged reservoir 134 and the brake cylinder, by way of pipes 135 and 136, past the unseated valve 31, and pipe 137. The fluid pressure brakes will be thus applied.

With the fluid pressure brakes applied the vehicle will begin to decelerate, and the force of inertia resulting from this deceleration will urge the body 71 to the right against opposition of spring 85. When the body 71 has been moved far enough to close contacts 77, the application electromagnet will again be energized, and the valve 31 seated to lap the supply of fluid under pressure to the brake cylinder. If the body 71 should move further to the right, contacts 75 will be closed to again energize the release electromagnet, thereby unseating release valve 32 to release fluid under pressure from the brake cylinder to the atmosphere. When sufficient fluid under pressure has been released from the brake cylinder to reduce the rate of retardation, the body 71 will move back to lap position.

It will be obvious that the movement of the body 71 to the right against tension of spring 85 is proportional to the rate of retardation of the vehicle, and that the positioning of the service group of contacts by movement of the brake controller handle 60 selects the rates of retardation at which the lap and release operations take place. It will therefore be seen that the retardation controller device may be adjusted to maintain, within tolerable limits, any desired rate of retardation by simple manipulation of the brake controller handle 60.

To release the fluid pressure brakes following an application, the brake controller handle 60 is turned to the release position, as shown in the drawing. This will result in again energizing both the application and release electromagnets in the magnet valve device 12, thus releasing fluid under pressure from the brake cylinder 10 in the manner already described. If, however, the brake controller handle 60 is permitted to remain in application position, then when the vehicle comes to a stop the force of inertia acting on the body 71 disappears and spring 85 will return the body 71 to the biased position shown, in which case the application and release electromagnets will be deenergized to effect a full application of the brakes.

If it is desired to prevent this full application through operation of the retardation controller device when the vehicle comes to a stop, the brake controller handle 60 may be moved to a lap position in which the plunger 138 engages a notch 139. In this position the service group of contacts will be positioned so that contacts 75 will be open and contacts 77 closed. The release valve 32 in the magnet valve device 12 will then be seated while the supply valve 31 will be unseated. This will retain the brake cylinder pressure existing at the time of the stop, which will be sufficient to insure holding the vehicle at rest on grades.

*Application of magnetic track brakes*

In the application of the fluid pressure brakes just previously described, any degree of application may be secured by moving the brake controller handle 60 to different positions into the application zone. When, however, the brake controller handle 60 is moved to a position where the contact segment 65 on the drum 62 connects the contact fingers 66 and 67, the switch operating magnet valve device 18 is energized through a circuit, which, beginning at the common conductor 124 includes contacts 66, 65 and 67 in the controller device 22, conductor 140, contacts 105 of relay 27, conductor 141, the magnet valve device 18, and conductors 142 and 128 back to the potentiometer terminal 120.

When the magnet valve device 18 is energized, it seats its release valve 55 and unseats its supply valve 54. Fluid under pressure may then flow from the reservoir pipe 135 past the unseated valve 54 and to the chamber 42 in the main switch device 16. Piston 43 then actuates stem 45 upwardly to open contacts 46 and 47 and close contacts 48 and 49. It is to be here noted that contacts 48 and 49 close just prior to opening of contacts 46 and 47.

Closing of contacts 49 establishes a circuit from the trolley 115 to the track brake device 13, by way of conductor 116, contacts 49, conductor 143, transformer primary winding 58, contacts 111 and 112 of switch device 28 (or resistance 29 if these contacts have not as yet closed), conductor 144, the track brake device, conductor 145, and ground 146.

Closing of contacts 48 establishes a circuit from the common conductor 123 to the electromagnet in the magnet valve device 15, by way of conductor 147, contacts 48, conductor 149, the magnet valve device 15, and return conductor 128 to the potentiometer terminal 120. Energization of the magnet valve device 15 actuates double beat valve 40 to lower seated position, thus venting chamber 35 in the raising cylinder 14 to atmosphere by way of exhaust port 150. The track brake device will then fall by gravity to engagement with the rail 39.

When the contacts 46 of the switch device 16 are opened the secondary winding 59 of the transformer 20 is thus open-circuited. When this secondary winding is open-circuited the impedance of the primary winding 58 is greatly increased, so that the initial rise of the current in the circuit to the track brake device is greatly impeded, thus increasing the time required for the current to build up to full strength.

If before the track brakes were applied the fluid pressure brakes had been first applied and the controller handle 60 then moved to the position where contact 65 just engages the contact finger 67, the additional braking which would result due to rapid energization of the track brake device would cause a very great increase in the rate of retardation, whereupon the retardation controller body 71 would move a relatively great distance to the right to effect a release of fluid under pressure from the brake cylinder 10 until the rate of retardation corresponded to the position of handle 60.

But with the build up of current in the track brake device retarded, due to the high impedance in transformer 20, the body 71 will move only far enough to the right to release fluid under pressure from the brake cylinder 10 at about the same rate as the current increases in the track brake circuit. Thus, instead of a sharp increase in the rate of retardation, there will be only a slight increase and the fluid pressure braking will be decreased at about the same rate that the track braking increases, so that a smooth combined application results.

Assuming now that the controller handle 60 has been moved to a position where the contact 65 does not yet engage contact 67, so that the fluid pressure brakes only are applied, and that it is now desired to effect a rapid application of the track brakes and an increase in degree of application of the fluid pressure brakes, as for example to avoid collision, the brake controller handle 60 may then be moved quickly to the right far enough to cause the roller associated with the service contact 76 to roll off the high part of cam 73 and thus open these contacts.

Opening of these contacts will effect deenergization of the magnet valve device 19, by interrupting a circuit which, beginning at the common conductor 124, includes contact 76, conductor 152, contacts 95 and 99 of relay 25, conductor 153, magnet valve device 19, and return conductor 128 back to the potentiometer terminal 120. Deenergization of the magnet valve device 19 effects seating of its supply valve 54 and unseating of its release valve 55. This will vent chamber 42 in the auxiliary switch device 17 to the atmosphere by way of exhaust port 155 in the magnet valve device 19. Switch device 17 will then open its contacts 52 and close its contacts 51.

At the same time, engagement of contact 65 with contact finger 67 will energize the switch controlling magnet valve device 18 to cause operation of the main switch device 16 as heretofore described. While the opening of contacts 46 on the switch device 16 open-circuits the transformer secondary winding 59, the closing of contacts 51 on the auxiliary switch device 17 at the same time short-circuits the transformer secondary winding, so that the impedance of the primary winding is now very low. The short-circuiting of the secondary winding takes place at the same time as, or slightly before, the circuit to the track brake device is established, so that the current in the track brake circuit can now build up at a rapid rate.

The fluid pressure brakes will be applied to an increased degree in response to the same movement of the brake controller handle 60, so that both the fluid pressure and track brakes will be instantly applied to a high degree.

It will thus be seen that the rate of build up of current in the energizing circuit to the track brake device is determined by the increment of movement of the brake controller handle 60 into that portion of the application zone which establishes track braking. If the handle 60 is first moved to the position where the fluid pressure brake only is applied and then moved through only a small increment to apply the track brake, the rate of current build up in the track brake circuit will be relatively slow. If however the handle 60 is moved by a much greater increment to apply the track brake, the rate of build up of current in the track brake circuit will be extremely rapid.

The described movement of the handle 60 positions the service group of contacts in the retardation controller device to establish the desired rate of retardation. As this rate of retardation is attained the body 71 will move to a position where the supply of fluid under pressure to the brake cylinder is lapped.

Just before the retardation controller body 71 effects the lap operation of the fluid pressure brakes, the roller associated with contacts 76 will roll onto the high part of cam 73 and thus again energize the magnet valve device 19. Energization of this magnet valve device will again supply fluid under pressure to chamber 42 of the auxiliary switch device 17, thus effecting closing of contacts 52 and opening of contacts 51, but this will not affect the energization of the track brake device.

As the vehicle slows down, the braking effect of the track brake device will tend to increase due to the increase in coefficient of friction between its shoes and the track rail. Since the current supplied to the track brake device is maintained substantially constant, the braking produced by the track brake device may be too great near the end of the stop before it is cut out of action. Because the track brake device is assuming a greater proportion of the braking as the speed decreases the fluid pressure brakes will be more and more released through operation of the retardation controller device, and when the pressure of fluid in the brake cylinder falls below some predetermined value, as for example 15 pounds, the switch device 28 will open its contacts 112, (which were previously closed by brake cylinder pressure) thus connecting resistance 29 in the track brake circuit. This will decrease the braking produced by the track brake, thus tapering off the braking at the end of the stop.

Also, as the vehicle slows down, a speed will be reached where the resistance in the motion detector device 26 will increase and relay 27 will pick up and thus open its contacts 105. Opening of these contacts effects deenergization of the switch controlling magnet valve device 18, thus permitting its spring 56 to seat its supply valve 54 and unseat its release valve 55. The chamber 42 of switch device 16 will then be vented to the atmosphere through the exhaust port 155, piston 43 will be moved downwardly and the circuit to the track brake device 13 will be opened.

When the track brake device is thus deenergized by operation of switch device 16, contacts 47 will close slightly ahead of opening of contacts 49 so that a dissipating circuit comprising contacts 47, resistance 113, contacts 52, and conductor 165 is connected through the primary winding 58, and resistance 29 (if in circuit at this time), to the track brake device 13. Thus the stored magnetic energy in the track brake device may be dissipated in this dissipating circuit without causing dangerously high potentials.

If after the fluid pressure and track brakes have been applied and the retardation controller device has assumed control, so that the contacts 76 and 77 are closed, it is desired to manually effect a release of the brakes, this may be accomplished by moving the brake controller handle 60 to release position. If a graduated release is desired the handle 60 is moved slowly toward release position. If, however, a quick release is desired, the handle is moved quickly toward the release position so that the roller associated with the contacts 76 will roll off the high part of cam 73 and thus deenergize the magnet valve device 19. This will, as before described, short-circuit the transformer secondary winding 59, thus reducing the impedance in the track brake energizing circuit, and permit the current to die away rapidly in this circuit.

Thus both a slow and quick build up of current in the track brake circuit and both a slow and rapid die away of current in the circuit may be controlled by slowly or quickly manipulating the brake controller handle 60, and thus properly operating the contacts 76 in the retardation control device. It will, of course, be understood that with direct current supplied from the trolley the impedance of transformer 20 will be effective only during current changes in the track brake circuit.

The fluid pressure brakes will be released as before described for a fluid pressure brake release, and when the vehicle comes to a stop the retardation controller device will, if in the meanwhile the handle 60 has not been moved to the lap position, make a full application of the fluid pressure brakes.

*Emergency or deadman application*

During each of the aforedescribed applications, the operator maintains pressure on the push button 90 in the deadman switch 24. If the pressure is released from this push button the circuit to the relay 25 will be opened and the relay thus deenergized. The movable contacts of the relay will then drop to engagement with the back contacts. Engagement of movable contact 94 with back contact 101 connects the release electromagnet of the magnet valve device 12 in series with the contacts 78 in the retardation controller device, through a circuit which includes, beginning at the relay contact 94, back contact 101, conductor 158, contacts 78, and from thence through the common conductors 123 and 122 to the potentiometer terminal 119.

Engagement of relay contact 96 with back contact 103 connects the application electromagnet of the magnet valve device 12 in series with contacts 80 in the retardation controller device, through a circuit which, beginning at the relay contact 96, includes conductor 159, contacts 80, and the common conductors 123 and 122 to the potentiometer terminal 119.

Engagement of relay contact 95 with back contact 102 connects the magnet valve device 19 in series with the retardation controller contacts 79, through a circuit which, beginning at the relay contact 95, includes, back contact 102, conductor 160, contact 79, and common conductors 123 and 122 to the potentiometer resistance terminal 119.

Engagement of relay contact 97 with back contact 104 by-passes the contacts on and engaging drum 62 of the brake controller 22, to energize the switch controlling magnet valve device 18 through a circuit which, from the common conductors 123 and 124, includes contacts 97 and 104, conductors 161 and 140, relay contacts 105, conductor 141, magnet valve device 18, and from thence through conductors 142 and 128 back to the potentiometer terminal 120.

Now since the retardation controller contacts 78, 79 and 80 are all open, it will be apparent that the magnet valve device 19 and the application and release electromagnets in the magnet valve device 12 will be deenergized, with the result that fluid under pressure will be supplied to the brake cylinder 10, while deenergization of the magnet valve device 19 will result in short-circuiting of the transformer secondary winding 59. At the same time, engagement of relay contact 97 with back contact 104 energizes magnet valve device 18 to cause switch device 16 to establish a circuit from the trolley to the track brake device 13. Both the fluid pressure brakes and the track brakes will thus be applied instantly to a maximum degree.

As the degree of braking increases and the retardation controller body 71 is urged to the extreme right, a high rate of retardation will be reached at which contacts 80 will be closed to energize the application electromagnet and thus lap the supply to the brake cylinder. If the body 71 continues to move to the right contacts 78 will be closed to energize the release electromagnet and thus release fluid under pressure from the brake cylinder. The retardation controller device will therefore be effective to permit the maximum rate of retardation.

Before however the lap or release operation will have taken place, contacts 79 will have been closed to energize the magnet valve device 19 and thus cause auxiliary switch device 17 to close contacts 52 and open contact 51, thus becoming effective to establish the dissipating circuit when the track brake devices are subsequently deenergized.

It will be apparent from the foregoing description that I have arranged the parts so that upon a failure of power supply at least the fluid pressure brakes will be applied, to a maximum degree, thus insuring stopping of the vehicle in case of such a contingency.

While I have described my invention with particular reference to one embodiment thereof, I do not wish to be limited to the exact details of this embodiment, nor otherwise than according to the spirit and scope of the appended claims.

Having now described my invention, what I claim as new and desire to secure by Letters Patent, is:

1. In a vehicle brake system, in combination, magnetic track brake means, a manually operated control element for controlling application of said brake means, means responsive to movement of said element to any position in a chosen application zone for effecting to one degree an application of said brake means, and means governed by the degree of movement of said element into said application zone for determining the initial rate of application of said brake means, regardless of the degree of application.

2. In a vehicle brake system, in combination, magnetic track brake means, a circuit for supplying current to operate said track brake means, a control handle, means responsive to movement of said control handle in a chosen application zone for effecting a supply of current to said circuit to a maximum degree, and means controlled by the extent of movement of said handle in said application zone for controlling the rate of build up of current in said circuit regardless of the degree of current supplied.

3. In a vehicle brake system, in combination, magnetic track brake means, a control element movable into a chosen application zone for effecting an application of said brake means, a set of contacts adapted to be operated only upon movement of said element through a predetermined movement in said application zone, means operative upon movement of said element to any position in said chosen application zone for effecting an application of said brake means, and means controlled by said set of contacts for controlling the rate of application of said brake means.

4. In a vehicle brake system, in combination, magnetic track brake means, a circuit for supplying current to said track brake means, means associated with said circuit for normally retarding the build up of current in said track brake means regardless of the degree of current supplied thereto, and means selectively operated for rendering said last mentioned means ineffective.

5. In a vehicle brake system, in combination, magnetic track brake means, a circuit for supplying current to said track brake means, means associated with said circuit for normally delaying the build up of current in said track brake means regardless of the degree of current supplied thereto, a set of contacts, means for selectively actuating said contacts, and means responsive to operation of said contacts for rendering said current delaying means ineffective.

6. In a vehicle brake system, in combination, magnetic track brake means, a circuit for supplying current to operate said track brake means, means associated with said circuit for normally retarding the build up of current in said circuit regardless of the degree of current supplied thereto, a normally closed circuit, and means operated upon opening of said circuit for controlling the effectiveness of said current retarding means.

7. In a vehicle brake system, in combination, magnetic track brake means, a circuit for supplying current to operate said track brake means, current regulating means associated with said circuit and adapted to be adjusted to permit the current in said circuit to build up at a fast rate or a slow rate regardless of the degree of current supplied to said circuit, a normally closed circuit, means operative so long as said last circuit is closed for adjusting said current regulating means to permit current to build up in said first circuit at a slow rate, and means responsive to opening of said last circuit for adjusting said current regulating means to permit current to build up in said first circuit at a fast rate.

8. In a vehicle brake system, in combination, magnetic track brake means, a circuit for supplying current to said track brake means, means for controlling the rate of build up of current in said circuit regardless of the degree of current supplied to said circuit, and electroresponsive means for controlling said last means.

9. In a vehicle brake system, in combination, magnetic track brake means, a circuit for supplying current to said track brake means, means for controlling the rate of build up of current in said circuit regardless of the degree of current supplied to said circuit, and fluid pressure operated means for controlling said last means.

10. In a vehicle brake system, in combination, magnetic track brake means, a circuit for supplying current to said track brake means, means for controlling the rate of build up of current in said circuit regardless of the degree of current supplied to said circuit, fluid pressure operated means for controlling said last means, and electroresponsive means for controlling operation of said fluid pressure operated means.

11. In a vehicle brake system, in combination, magnetic track brake means, means for supplying current to operate said track brake means, current regulating means for controlling the rate of build up of current in said track brake means regardless of the degree of current supplied thereto, normally closed contacts, and electroresponsive means operated when said contacts are opened to render said current regulating means effective in permitting current to build up in said brake means at a rapid rate.

12. In a vehicle brake system, in combination, magnetic track brake means, a control handle movable to different positions in an application zone, normally closed contacts, means responsive to operation of said control handle to any position in said application zone for effecting a maximum supply of current to said brake means, means responsive to movement of said handle to a chosen extent in said application zone for effecting opening of said contacts, means normally operative to retard the build up of current in said track brake means, and means responsive to opening of said contacts for rendering said retarding means ineffective to retard the build up of current in said track brake means.

13. In a vehicle brake system, in combination, magnetic track brake means, a circuit for supplying current to said track brake means, current regulating means associated with said circuit for controlling the rate of build up of current in said circuit regardless of the degree of current supplied thereto, two sets of contacts, means responsive to the closing of either of said sets of contacts for causing said current regulating means to be adjusted to permit current to build up in said circuit at a rapid rate.

14. In a vehicle brake system, in combination, magnetic track brake means, a circuit for supplying current to said track brake means, current regulating means for controlling the rate of build up of current in said circuit regardless of the degree of current supplied thereto, two fluid pressure operated switch devices, means responsive to the supply of fluid under pressure to both of said switch devices for adjusting said current regulating means to permit the current in said circuit to build up at a slow rate and responsive to a decrease of pressure in either of said switch devices for adjusting said current regulating means to permit current to build up in said circuit at a rapid rate.

15. In a vehicle brake system, in combination, magnetic track brake means, a circuit for supplying current to said track brake means, current regulating means associated with said circuit for controlling the rate of build up of current in said circuit regardless of the degree of current supplied thereto, two electroresponsive devices, means responsive to the energization of both of said electroresponsive devices for causing said electroresponsive means to permit current to build up in said circuit at a slow rate and responsive to deenergization of one of said electroresponsive devices for causing said current regulating means to permit current to build up in said circuit at a rapid rate.

16. In a vehicle brake system, in combination, magnetic track brake means, a circuit for supplying current to operate said track brake means, an inductive device disposed in said circuit, said inductive device having an impedance adjustable according to the desired rate of build up of current in said circuit, and means for controlling the adjusting of the impedance in said inductive device.

17. In a vehicle brake system, in combination, magnetic track brake means, a circuit for supplying current to operate said track brake means, an inductive device disposed in said circuit, said inductive device having an impedance adjustable according to the desired rate of build up of current in said circuit, a set of contacts adapted to be operated at will, means operative while said contacts are closed for causing the impedance of said inductive device to be high and operative when said contacts are opened for causing the impedance of said device to be low, and manually operated means for operating said contacts at will.

18. In a vehicle brake system, in combination, magnetic track brake means, a circuit for supplying current to operate said track brake means, a transformer device having a primary winding and a secondary winding, said primary winding being connected in said circuit and being adapted to establish a high impedance in said circuit when said secondary winding is open-circuited and to establish a low impedance in said circuit when said secondary winding is short-circuited, and means for controlling the impedance in said circuit by controlling the connections of said secondary winding.

19. In a vehicle brake system, in combination, magnetic track brake means, a circuit for supplying current to said track brake means, a transformer device having a primary winding and a secondary winding, said primary winding being connected in said circuit and being adapted to establish a high impedance in said circuit when said secondary winding is open-circuited and to establish a low impedance in said circuit when said secondary winding is short-circuited, a control handle, means responsive to movement of said handle to any position in a chosen application zone for effecting a supply of current to said track brake circuit to a maximum degree, and means responsive to a predetermined movement of said handle in said application zone for effecting short-circuiting of said transformer secondary winding.

20. In a vehicle brake system, in combination, magnetic track brake means, a control handle movable into an application zone, means responsive to movement of said handle to any position in said application zone for effecting a supply of current to said track brake means, and means responsive to movement of said handle from a predetermined position in said application zone through a chosen distance toward release position for controlling the rate of die away of current in said track brake means.

21. In a vehicle brake system, in combination, magnetic track brake means, a control handle, means responsive to movement of said control handle to any position in a chosen application zone for effecting to the same degree a supply of current to said track brake means, a normally closed set of contacts, means responsive to movement of said handle to a chosen position in said application zone for effecting opening of said contacts, inertia operated means for subsequently effecting closing of said contacts, said contacts being adapted thereafter to be closed upon return movement of said handle toward release position, and means controlled by the opening of said contacts upon return movement of said control handle for controlling the rate of die away of current in said track brake means.

22. In a vehicle brake system, in combination, magnetic track brake means, means for supplying current to said track brake means, a set of contacts adapted to be opened when current is supplied to said track brake means and to be closed as said track brake means is disconnected from the source of current supply, a dissipating circuit, electroresponsive means operable to effect closing of said contacts to connect said dissipating circuit to said track brake means for dissipating the magnetic energy stored in said track brake means due to energization thereof.

23. In a vehicle brake system, in combination, magnetic track brake means, a control handle, means responsive to movement of said control handle into an application zone for effecting a supply of current to said track brake means, and responsive to return movement of said handle to release position to effect deenergization of said track brake means, and electrically controlled means responsive only to movement of said handle through a predetermined distance in said application zone and before reaching release position for establishing a dissipating circuit for dissipating the stored inductive energy in said track brake means.

24. In a vehicle brake system, in combination, magnetic track brake means, a dissipating circuit for dissipating the stored magnetic energy in said track brake means upon deenergization thereof, two fluid pressure operated switch devices, and means operated upon decrease of pressure in one of said switch devices and increase of pressure in the other of said switch devices for connecting said dissipating circuit to said track brake means.

25. In a vehicle brake system, in combination, magnetic track brake means, a dissipating circuit for dissipating the stored magnetic energy in said track brake means when deenergized, two electroresponsive devices, and means operated when one of said electroresponsive devices is deenergized and the other is energized for connecting said dissipating circuit to said track brake means.

26. In a vehicle brake system, in combination, magnetic track brake means, fluid pressure brake means, control means having a manually operated element and being adapted upon movement of said element through a first portion of an application zone to effect a supply of fluid under pressure to said fluid pressure brake means, and being operative upon movement of said element through a second portion of said application zone to effect an application of said track brake means to a chosen degree regardless of the extent of movement in said second portion of said application zone, and means governed by the extent of movement of said element in said second portion of said application zone for controlling the rate of build up of current in said track brake means.

27. In a vehicle brake system, in combination, magnetic track brake means, fluid pressure brake means, control means having a manually operated element and being operative upon movement of said element into a first zone to effect a supply of fluid under pressure to said fluid pressure brake means and operative upon movement of said element into a second zone to effect a supply of current to said track brake means, a set of contacts, means for operating said contacts upon movement of said element into said second zone, and means controlled by said contacts for controlling the rate of build up of current in said track brake means regardless of the degree of current supplied thereto.

28. In a vehicle brake system, in combination, fluid pressure brake means, magnetic track brake means, a control handle, means responsive to movement of said control handle in a first application zone for effecting a supply of fluid under pressure to said fluid pressure brake means, means responsive to movement of said handle to any position in a second zone for supplying current of one degree to said magnetic track brake means, and means governed by the extent of movement of said handle into said second zone for controlling the rate of build up of current in said magnetic track brake means.

29. In a vehicle brake system, in combination, fluid pressure brake means, magnetic track brake means, a retardation controller device having a manually movable element and an inertia operated element operated according to the rate of retardation of the vehicle, means responsive to movement of said manually movable element through a first zone for effecting a supply of fluid under pressure to said fluid pressure brake means and responsive subsequently to movement of said inertia operated element for lapping said supply, means for effecting a supply of current to said magnetic track brake means, and means responsive to movement of said manually movable element a predetermined distance beyond said movement in said first zone for controlling the rate of build up of current in said magnetic track brake means.

30. In a vehicle brake system, in combination, fluid pressure brake means, magnetic track brake means, a retardation controller device having a plurality of manually positionable contacts and an inertia operated member, means responsive to the manual positioning of said contacts in a first zone for effecting a supply of fluid under pressure to said fluid pressure brake means, means for effecting a supply of current to said magnetic track brake means, current regulating means for controlling the rate of build up of current in said magnetic track brake means regardless of the degree of current supplied thereto, and means responsive to the manual positioning of said contacts beyond said first zone for controlling said current regulating means, said inertia operated member being operative subsequently to control the degree of application of one of said two brake means.

31. In a vehicle brake system, in combination, fluid pressure brake means, magnetic track brake means, a control handle, a plurality of normally closed contacts, means responsive to movement of said control handle through a first zone for effecting opening of a first group of said contacts, means responsive to the opening of said first group of contacts for effecting a supply of fluid under pressure to said fluid pressure brake means, means responsive to further movement of said handle to any position in a second zone for effecting a supply of current to said magnetic track brake means, means responsive to a predetermined extent of movement of said handle in said second zone for effecting opening of another of said plurality of contacts, and means responsive to opening of said last mentioned contacts for controlling the rate of build up of current in said track brake means regardless of the degree of current supplied thereto.

32. In a vehicle brake system, in combination, magnetic track brake means, fluid pressure brake means, a control handle, means responsive to movement of said handle in a first zone for effecting a supply of fluid under pressure to said fluid pressure brake means, means responsive to movement of said handle to any position in a second zone for effecting to one degree a supply of current to said magnetic track brake means, means responsive to the extent of movement of said handle in said second zone for controlling the rate of build up of current in said magnetic track brake means, and responsive to the extent of return movement of said handle in said second zone toward release position for establishing a dissipating circuit for dissipating the stored magnetic energy in said track brake means upon deenergization thereof.

33. In a vehicle brake system, in combination, fluid pressure brake means, magnetic track brake means, a control handle, means responsive to movement of said control handle through a first zone for effecting a supply of fluid under pressure to said fluid pressure brake means, means responsive to movement of said handle to any position in a second zone for effecting to one degree a supply of current to said magnetic track brake means, means responsive to the extent of movement of said handle in said second zone for controlling the rate of build up of current in said magnetic track brake means, and means controlled by the pressure of fluid supplied to said fluid pressure brake means for controlling the degree of current supplied to said magnetic track brake means.

34. In a vehicle brake system, in combination, a brake cylinder, a magnetic track brake device, a control handle, means responsive to movement of said control handle in a first zone for effecting a supply of fluid under pressure to said brake cylinder, means responsive to movement of said handle to any position in a second zone for effecting to one degree a supply of current to said track brake device, means responsive to the extent of movement of said handle in said second zone for controlling the rate of build up of current in said track brake device, and means operable according to brake cylinder pressure to control the degree of current supplied to said track brake device and operable at a relatively low brake cylinder pressure to decrease the energization of said track brake device.

35. In a vehicle brake system, in combination, fluid pressure brake means, magnetic track brake means, a control handle, means responsive to movement of said control handle through a first zone for effecting a supply of fluid under pressure to said fluid pressure brake means, means responsive to movement of said handle to any position in a second zone for effecting to one degree a supply of current to said magnetic track brake means, a retardation controller device for controlling application of said fluid pressure brake means and operable to effect a full application of said fluid pressure brake means when the vehicle comes to a stop, and means providing a lap position for said handle and responsive to movement of said handle to said lap position for preventing said full application of said fluid pressure brake means by said retardation controller device when the vehicle comes to a stop.

36. In a vehicle brake system, in combination, magnetic track brake means, a circuit for supplying current to said track brake means, a current regulating means associated with said circuit and being normally adjusted to permit the current in said circuit to build up at a slow rate regardless of the degree of current supplied thereto, safety control means, and means responsive to operation of said safety control means for effecting adjustment of said current regulating means to permit said current to build up in said circuit at a fast rate.

37. In a vehicle brake system, in combination, magnetic track brake means, a circuit for supplying current to said track brake means, current regulating means in said circuit normally adjusted to permit the current to build up in said circuit at a slow rate regardless of the degree of current supplied to said circuit, a normally energized relay, and means operated upon deenergization of said relay for causing said current regulating means to permit current to build up in said circuit at a fast rate.

38. In a vehicle brake system, in combination, magnetic track brake means, a circuit for supplying current to said track brake means, current regulating means in said circuit normally adjusted to permit the current to build up in said circuit at a slow rate regardless of the degree of current supplied to said circuit, a normally energized relay, means operated upon deenergization of said relay for causing said current regulating means to permit current to build up in said circuit at a fast rate, and safety control means for controlling energization and deenergization of said relay.

39. In a vehicle brake system, in combination, fluid pressure brake means, magnetic track brake means, a plurality of manually positionable contacts, means responsive to manual positioning of certain of said contacts for controlling application of said fluid pressure brake means, means responsive to manual positioning of other of said contacts for controlling application of said magnetic track brake means, a plurality of stationary contacts corresponding to said manually positionable contacts, a normally energized relay, means operative when said relay is energized to render said manually positionable contacts effective in controlling said two braking means, and means operative when said relay is deenergized for rendering said stationary contacts effective in controlling said two brake means.

40. In a vehicle brake system, in combination, fluid pressure brake means, magnetic track brake means, a plurality of manually positionable contacts, means responsive to manual positioning of certain of said contacts for controlling application of said fluid pressure brake means, means responsive to manual positioning of other of said contacts for controlling application of said magnetic track brake means, a plurality of stationary contacts corresponding to said manually positionable contacts, a normally energized relay, means operative when said relay is energized to render said manually positionable contacts effective in controlling said two braking means, means operative when said relay is deenergized for rendering said stationary contacts effective in controlling said two brake means, and safety control means for controlling energization and deenergization of said relay.

41. In a vehicle brake system, in combination, fluid pressure brake means, magnetic track brake means, a controller device having a handle movable through a first application zone and movable thereafter through a second application zone, means responsive to movement of said handle through said first zone for effecting an application of said fluid pressure brake means, means responsive to movement of said handle through said second zone for effecting an application of said magnetic track brake means, a normally energized relay, and means operative upon deenergization of said relay for effecting application of both of said braking means independently of movement of said control handle to either of said zones.

42. In a vehicle brake system, in combination, magnetic track brake means, fluid pressure brake means, a plurality of normally closed contacts, means responsive to opening of certain of said contacts for effecting an application of said fluid pressure brake means, means responsive to opening of the other of said contacts for controlling application of said magnetic track brake means, inertia operated means for controlling said contacts, normally open contacts corresponding to said normally closed contacts and effective also in controlling said two braking means, said two braking means being adapted when under the control of said normally open contacts to be applied until said normally open contacts are closed, said inertia operated means being adapted at a chosen rate of retardation to close said normally open contacts, selective means for selectively placing said two braking means under the control of either of said sets of contacts, and safety control means for controlling said selective means.

43. In a vehicle brake system, in combination, magnetic track brake means, a manually operated controller device operable to an application position to effect an application of said track brake means, cut out means for cutting said track brake means out of action at a predetermined low speed of the vehicle, and means for rendering said cut out means effective only when said controller device has been operated to application position.

44. In a vehicle brake system, in combination, magnetic track brake means, a circuit through which current is supplied to effect an application of said track brake means, normally closed contacts in said circuit, a controller device operable to an application position to supply current to said circuit, electroresponsive means responsive to the speed of the vehicle and operable at a predetermined low speed for opening said contacts, and means for rendering said electroresponsive means ineffective until said controller device has been operated to application position.

45. In a vehicle brake system, in combination, fluid pressure brake means, magnetic track brake means, a control handle, means responsive to movement of said handle through a first zone for effecting application of said fluid pressure brake means, means responsive to movement of said handle to any position in a second zone for effecting to one degree a supply of current to said magnetic track brake means, means responsive to the extent of movement of said handle in said second zone for controlling the rate of build up of current in said magnetic track brake means, and means responsive to the speed of the vehicle and operated at a predetermined low speed for interrupting the supply of current to said track brake means.

46. In a vehicle brake system, in combination, a brake cylinder, a magnetic track brake device, a resistance device adapted to be connected between a trolley and ground, electroresponsive valve means connected across a portion of said resistance device and adapted to be energized when current flows in said resistance device, and to be deenergized when current ceases to flow in said resistance device to effect a supply of fluid under pressure to said brake cylinder, and electroresponsive control means also connected across said portion of said resistance device and adapted to be energized when current flows in said resistance device, to maintain said track brake device inoperative, and to be deenergized when current ceases to flow in said resistance device to render said track brake device operative.

JOHN W. LOGAN, Jr.